US006468596B1

(12) United States Patent
Liu et al.

(10) Patent No.: US 6,468,596 B1
(45) Date of Patent: Oct. 22, 2002

(54) LASER-ASSISTED IN-SITU FRACTIONATED LUBRICANT AND A NEW PROCESS FOR SURFACE OF MAGNETIC RECORDING MEDIA

(75) Inventors: Youming Liu, Palo Alto; Jialuo Jack Xuan, Milpitas; Xiaohua Shel Yang, Fremont; Chung-Yuang Shih, Cupertino; Vidya K. Gubbi, Milpitas, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/577,674

(22) Filed: May 25, 2000

Related U.S. Application Data
(60) Provisional application No. 60/144,357, filed on Jul. 15, 1999.

(51) Int. Cl.[7] .............................. C08F 2/48; C08J 7/18; C23C 14/30

(52) U.S. Cl. ........................ 427/508; 427/554; 427/596

(58) Field of Search .................................. 427/510, 554, 427/555, 556, 597, 127, 226, 258, 261, 264, 270, 271, 402, 508

(56) References Cited

U.S. PATENT DOCUMENTS

| 3,674,340 A | 7/1972 | Jacob et al. ................. 350/157 |
| 3,764,218 A | 10/1973 | Schedewie ................... 356/118 |
| 3,938,878 A | 2/1976 | Fox .............................. 350/150 |

(List continued on next page.)

FOREIGN PATENT DOCUMENTS

| EP | 0 652 554 A1 | 10/1995 |

OTHER PUBLICATIONS

P. Baumgart et al., "A New Laser Texturing Technique For High Performance Magnetic Disk Drives" IBM storage Systems Division and IBM Almadon Research Center, San Jose, CA.

D. Kuo et al., "Laser Zone Texturing on Glass and Glass–Ceramic Substrates" Seagate Recording Media, Fremont, CA.

P. Baumgart et al., "Safe Landings: Laser Texturing of High–Density Magnetic Disks" IBM Corp., *Data Storage* 1996.

A. Tam et al., "Laser Cleaning Techniques for Removal of Surface Particulates" IBM Research Division, San Jose, *Journal of Applied Physics* 71 (7), Apr. 1, 1992, pp. 3515–3523.

K. Johnson et al., "In–Plane Anisotropy in Thin–Film Physical Origins of Orientation Ratio (Invited)" IBM Storage Systems Division, San Jose, CA, *IEEE Transactions on Magnetics* vol. 31, No. 6, Nov. 1995, pp. 2721–2727.

J. Miles et al., "Micromagnetic Simulation of Textured Induced Orientation in Thin Film Media" the University of Manchester, Manchester, M13 9PL, U.K., *IEEE Transactions on Magnetics* vol. 31, No. 6, Nov. 1995, pp. 2770–2772.

C. Kissinger et al., "Fiber Optic Probe Measures Runout of Stacked Disks" B.W. Brennan Associates, *Data Storage* Jul./Aug. 1997.

*Primary Examiner*—Shrive P. Beck
*Assistant Examiner*—Eric B. Fuller
(74) *Attorney, Agent, or Firm*—McDermott, Will & Emery

(57) ABSTRACT

A magnetic recording medium is formed with enhanced tribological performance by applying a raw, unfractionated lubricant having a wide molecular weight distribution over a disk surface and treating the deposited lubricant with a laser light beam to effect in-situ fractionation of the lubricant to a very narrow molecular weight distribution. Embodiments of the present invention also include laser treating a deposited lubricant to increase the thickness of the bonded lube layer.

16 Claims, 1 Drawing Sheet

U.S. PATENT DOCUMENTS

| | | | |
|---|---|---|---|
| 4,060,306 A | 11/1977 | Swaminathan | 350/87 |
| 4,139,263 A | 2/1979 | Lehureau et al. | 350/157 |
| 5,062,021 A | 10/1991 | Ranjan et al. | 360/135 |
| 5,120,927 A | 6/1992 | Williams et al. | 219/121.68 |
| 5,128,914 A | 7/1992 | Kurata et al. | 369/44.37 |
| 5,153,785 A | 10/1992 | Muranushi et al. | 360/75 |
| 5,166,006 A | 11/1992 | Lal et al. | 428/612 |
| 5,202,810 A | 4/1993 | Nakamura et al. | 360/135 |
| 5,273,834 A | 12/1993 | Hoover et al. | 428/694 |
| 5,391,522 A | 2/1995 | Goto et al. | 501/4 |
| 5,402,407 A | 3/1995 | Eguchi et al. | 369/112 |
| 5,409,738 A * | 4/1995 | Matsunuma et al. | 427/502 |
| 5,416,755 A | 5/1995 | Endo et al. | 369/13 |
| 5,520,981 A | 5/1996 | Yang et al. | 428/65.5 |
| 5,539,059 A * | 7/1996 | Bierschenk et al. | 525/331.6 |
| 5,550,696 A | 8/1996 | Nguyen | 360/135 |
| 5,595,791 A | 1/1997 | Baumgart et al. | 427/554 |
| 5,650,900 A * | 7/1997 | Wei et al. | 360/135 |
| 5,674,582 A | 10/1997 | Eltoukhy et al. | 428/65.4 |
| 5,741,577 A * | 4/1998 | Yamamoto et al. | 428/502 |
| 5,768,076 A | 6/1998 | Baumgart et al. | 360/135 |
| 5,804,304 A * | 9/1998 | Williams et al. | 428/364 |
| 5,820,945 A | 10/1998 | Wei et al. | 427/555 |
| 5,822,163 A * | 10/1998 | Lee et al. | 360/135 |
| 6,096,385 A * | 8/2000 | Yong et al. | 427/510 |
| 6,096,694 A * | 8/2000 | Tei et al. | 508/562 |
| 6,168,831 B1 * | 1/2001 | Khan et al. | 427/240 |
| 6,190,749 B1 * | 2/2001 | Stirniman et al. | 428/64.1 |
| 6,221,442 B1 * | 4/2001 | Xuan et al. | 427/555 |

* cited by examiner

US 6,468,596 B1

LASER-ASSISTED IN-SITU FRACTIONATED LUBRICANT AND A NEW PROCESS FOR SURFACE OF MAGNETIC RECORDING MEDIA

RELATED APPLICATIONS

This application claims priority from Provisional Patent Application Serial No. 60/144,357 filed Jul. 15, 1999, entitled "Lazer-Assisted In-Situ Fractionated Lubricant And A New Process for Surface of Magnetic Recording Media", the entire disclosure of which is hereby incorporated by referenced herein.

TECHNICAL FIELD

The present invention relates to a method of manufacturing a magnetic recording medium having a lubricant topcoat exhibiting improved tribological performance and reduced stiction failures. The present invention has particular applicability in manufacturing magnetic recording media suitable for high density recording and long term magnetic performance stability.

BACKGROUND ART

Thin film magnetic recording disks and disk drives are conventionally employed for storing large amounts of data in magnetizable form. In operation, a typical contact start/stop (CSS) method commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

For optimum consistency and predictability, it is necessary to maintain each transducer head as close to its associated recording surface as possible, i.e., to minimize the flying height of the head. Accordingly, a smooth recording surface is preferred, as well as a smooth opposing surface of the associated transducer head. However, if the head surface and the recording surface are too flat, the precision match of these surfaces gives rise to excessive stiction and friction during the start up and stopping phases, thereby causing wear to the head and recording surfaces, eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques include laser texturing the surface of a non-magnetic substrate to provide a textured landing zone in which a magnetic head can land when the drive is not in use, and can take off when the drive is reading and writing data. Typically, the surface of the non-magnetic substrate is polished to a specular finish prior to laser texturing to form the landing zone leaving a substantially smooth data zone. Subsequently, an underlayer, a magnetic layer, a protective overcoat and a lubricant topcoat are sequentially deposited, wherein the textured surface on the substrate is intended to be substantially replicated in the subsequently deposited layers. Typical substrate materials include an aluminum alloy with a layer of amorphous nickel phosphorous thereon, glasses, ceramics and glass-ceramic materials, as well as graphite. Underlayers typically comprise chromium or a chromium alloy, while the magnetic layer typically comprises a cobalt based alloy. Protective overcoats typically contain carbon. Such layers are typically deposited by sputtering techniques preformed in an apparatus containing sequential deposition chambers.

In accordance with conventional practices, a lubricant topcoat is uniformly bonded to the protective overcoat. The lubricant topcoat applied to the protective overcoat performs several functions. The lubricant topcoat improves tribological performance for reduced friction, stiction and crash rate at the heat-disk-interface. In addition, a lubricant topcoat prevents wear between the disk and head interface during drive operation. Excessive wear of the protective overcoat increases friction between the head and disk, thereby causing catastrophic drive failure. In addition, the lubricant topcoat prevents the protective overcoat from corrosion and other damage, thereby providing long-term magnetic performance stability.

Excess lubricant at the head-disk interface causes high stiction between the head and disk. If stiction is excessive, the drive cannot start and catastrophic failure occurs. Accordingly, the lubricant thickness must be optimized for stiction and friction.

Conventional employed lubricants include perfluoro polyethers (PFPEs) which are long chain polymers composed of repeat units of a small perfluoronated aliphatic oxides, such as perfluoroethylene oxide or perfluoropropylene oxide. PFPEs typically provide excellent lubricity, a wide liquid-phase temperature range, low vapor pressure, small temperature dependence of viscosity, high thermal stability and low chemical reactivity. PFPEs also exhibit low surface tension, resistant to oxidation at elevated temperatures, low toxicity and moderately high solubility for oxygen. Various PFPE polymers are commercially available, such as Fromblinz, Fromblinz Y including Z-dol and am2001 from Montedison and Demnum from Daikin.

A typical lubricant coating comprises a bonded lube layer and a mobile lube layer thereon. The bonded lube layer contains lubricant molecules which are chemically or physically bonded to the overcoat, i.e., carbon, on the disk. The bonded lubricant molecules can not be removed by washing with a solvent as can the mobile lube layer. Bonding assists in reducing lubricant which can be lost due to spin off, evaporation or chemical displacement. It has been theorized that a bonded lube layer contributes to lower stiction forces. The mobile lube layer contains molecules that are not bonded and can be easily removed with an appropriate solvent.

Conventional practices in texturing the substrate, e.g., a non-magnetic substrate or underlayer provided thereon, comprise decoupling the magnetic requirements (data zone on which information is recorded and read) from the mechanical requirements (landing zone), by forming a dedicated landing zone where the slider is parked and lands after the drive has been shut down. Adverting to FIG. 1, a conventional magnetic recording disk 10 for a Winchester hard-drive design comprises an inner annular landing zone 11 and an outer annular data zone 12. As a result of such zone design, the thickness of the lubricant topcoat is typically optimized for improved tribological performance and reduced friction, stiction and crash rate at the head-disk interface. Accordingly, the thickness required for the landing zone, which undergoes a large number of head-disk contacts, is required to be greater than the thickness of the lubricant topcoat overlying the data zone, where only a thin continuous lubricant layer is required to prevent corrosion and damage to the underlying protective overcoat thereby ensuring long-term magnetic performance stability.

However, conventional methods for forming a lubricant topcoat in the magnetic media industry, such as "dip-lube", "vapor-lube" and "spray-lube", are only capable of forming a lubricant topcoat at a substantially uniform thickness across the entire disk surface without differentiating the lubricant thickness between the different radial zones, i.e., landing zone and data zone. The conventional practice of depositing a lubricant topcoat at a uniform thickness overlying both the data zone and landing zone is problematic. For example, upon applying a thick lubricant topcoat for improved tribological performance, fly-stiction occurs as a result of lubricant transferred to the head when it flies over the data zone, and lubricant is transferred from the head to the head-disk interface when it rests at the landing zone, thereby causing stiction failure.

Eltoukhy et al. in U.S. Pat. No. 5,674,582 disclose a method of manufacturing a thin film disk media with differential lubricant thicknesses by initially applying a lubricant area and then buffing the lubricant over the data area as to provide a substantially reduced lubricant layer overlying the data zone for improved friction. Wei et al. in U.S. Pat. No. 5,820,945 disclose a magnetic disk having a zone of different lubricant thickness, such as lubricant-free, bonded-only or mostly-bonded, covering a different portion of the disk, such as over the data zone. In copending U.S. patent application Ser. No. 09/311,366 filed on May 13, 1999 now U.S. Pat. No. 6,221,442B1, a method is disclosed for reducing the lubricant thickness over the data zone using a laser light beam. The entire disclosure of copending U.S. patent application Ser. No. 09/311,366 (U.S. Pat. No. 6,221,442B1) is hereby incorporated by reference herein.

Conventional practices further seek to enhance topological performance by initially treating a raw lubricant containing a relatively broad molecular range distribution by supercritical fluid extraction (SFE) and then applying such a treated lubricant, e.g., a PFPE lubricant, to a magnetic disk structure, e.g., on the carbon-containing overcoat. For example, Zdol-2000 available from Ausimont, exhibits a relatively broad molecular weight distribution of about 900 to about 10,000 and, hence, does not satisfy the rigid tribological performance requirements for current magnetic media wherein the head to media spacing is significantly reduced for higher storage densities, e.g., less than about 100 Å. Accordingly, such lubricants are initially subjected to SFE, whereby the molecular range distribution is reduced by about 30%, e.g., to about 3,000±200. Unfortunately, the use of lubricants previously subjected to SFE is extremely costly due to low yield and, hence, the lubricant cost is increased by about 2 to 15 times of the raw lubricant.

Accordingly, there exists a need for an efficient, cost-effective method of manufacturing a magnetic recording medium with a lubricant topcoat exhibiting improved tribological performance and fly-stiction.

DISCLOSURE OF THE INVENTION

An advantage of the present invention is an efficient cost-effective method of manufacturing a magnetic recording medium having a lubricant topcoat optimized for tribological performance with reduced fly-stiction.

Additional advantages and other features of the present invention will be set forth in part in the description which follows and in part will become apparent to those having ordinary skill in the art upon examination of the following or may be learned from the practice of the present invention. The advantages of the present invention may be realized and obtained as particularly pointed out in the appended claims.

According to the present invention, the foregoing and other advantages are achieved in part by a method of manufacturing a magnetic recording medium, the method comprising: applying a lubricant having a broad molecular weight distribution to form a lubricant coating having a first thickness on a surface of a composite containing a magnetic layer on a non-magnetic substrate, the surface of the composite having a landing zone and data zone; and treating the applied lubricant coating with a laser light beam to effect in-situ fractionation, thereby reducing the molecular weight distribution of the lubricant.

Embodiments of the present invention comprise applying a PFPE lubricant having a relatively broad molecular weight distribution, e.g., about 500 to about 15,000, to a carbon-containing protective overcoat and treating the applied PFPE lubricant with a laser light beam to reduce the molecular weight distribution by about 30%, e.g., to about 3,500±100. Embodiments of the present invention further include treating the deposited lubricant to reduce the thickness over the data zone with respect to the thickness of the lubricant coating over the landing zone. Embodiments of the present invention further include treating the deposited lubricant with a laser light beam to increase the thickness of the deposited bonded lube layer by no less than about 100%.

Additional advantages of the present invention will become readily apparent to those having ordinary skill in the art from the following detailed description, wherein the embodiments of the present invention are described, simply by way of illustration of the best mode contemplated for carrying out the present invention. As will be realized, the present invention is capable of other and different embodiments, and its several details are capable of modifications in various obvious respects, all without departing from the present invention. Accordingly, the drawings and description are to be regarded as illustrative in nature, and not as restrictive.

DESCRIPTION OF THE INVENTION

The present invention addresses and solves problems stemming from the conventional practices of depositing a lubricant topcoat optimized for tribological performance over both the landing zone and data zone. Such problems include fly-stiction due to the transfer of lubricant to the head while flying over the data zone, and subsequent lubricant transfer from the head to the disk interface in the landing zone resulting in stiction failure. The present invention also addresses and solves the high cost problem attendant upon employing a lubricant that has been subjected to SFE for improved tribological performance at low flying heights. The present invention provides an improved, efficient and cost effective method of optimizing tribological performance.

Figure 1:
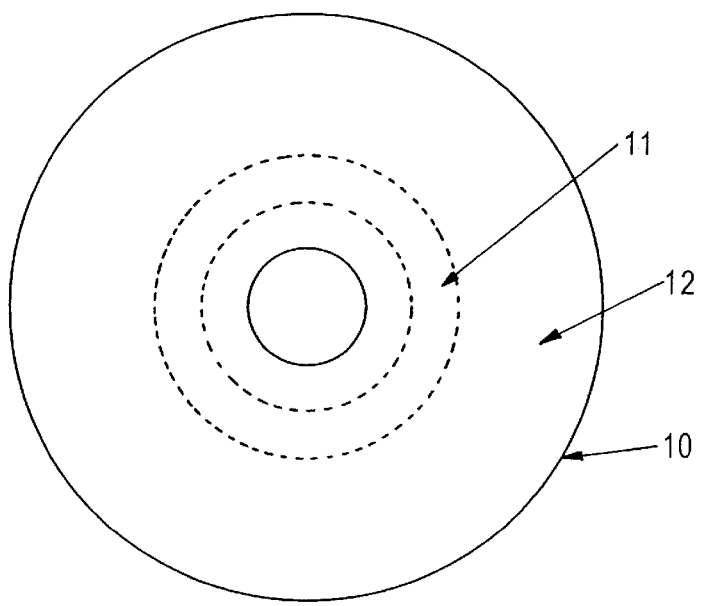
FIG. 1 schematically illustrates a conventional two zone magnetic recording disk.

In accordance with the present invention, a lubricant topcoat is formed on a conventional composite comprising a magnetic recording layer on a non-magnetic substrate, the surface of which contains a data zone and landing zone, such as that depicted in FIG. 1. In accordance with embodiments of the present invention, a raw lubricant having a wide molecular weight distribution is initially deposited, rather than a lubricant that has been fractionated by SFE to provide a narrow molecular weight distribution to optimum topological performance. The deposited lubricant coating having a wide molecular weight distribution is subjected to treatment with a laser light beam to effect in-situ fractionation on the disk surface, thereby significantly reducing the molecular weight distribution for optimum tribological performance in an efficient, cost effective manner. Significantly, a deposited lubricant coating treated with a laser light beam in accordance with embodiments of the present invention contains a bonded lube layer having a significantly increased thickness vis-a-vis the as-deposited bonded lube layer thickness.

In accordance with some embodiments of the present invention, the lubricant topcoat can also be formed at differential thicknesses as disclosed in copending U.S. patent application Ser. No. 09/311,366, (U.S. Pat. No. 6,221,442B1) by selectively volatilizing a portion of the lubricant such that the thickness of the lubricant topcoat over the landing zone is optimized for tribological performance, while the thickness of the lubricant topcoat over the data zone is reduced vis-à-vis the thickness of the lubricant topcoat over the landing zone to a degree sufficient to protect the underlying layer thereby ensuring long-term magnetic performance stability. In this way, the head can fly at a relatively lower flying height over the data zone with an attendant reduction in lubricant transferred to the head thereby reducing stiction failure.

The present invention advantageously avoids the costly necessity of SFE processing by extending laser technology to treat the surface of the deposited lubricant coating to generate equivalent or even better tribological performance vis-à-vis media on which an SFE treated lubricant is deposited. Moreover, the present invention significantly reduces the number of processing steps, thereby simplifying manufacturing and reducing costs.

Embodiments of the present invention, therefore, comprise depositing a raw lubricant having a wide molecular weight distribution, such as a PFPE having a molecular weight distribution of about 500 to about 15,000, e.g., about 900 to about 10,000, and treating the applied lubricant with a laser light beam to reduce the molecular weight distribution by about 30%, such as to a molecular weight distribution to about 3,500±100, or a molecular weight distribution of about 3,000±200. It was further found that treatment of the lubricant with a laser light beam increases the thickness of the originally deposited bonded lube layer by at least 100%. Accordingly, embodiments of the present invention comprise depositing a lubricant having a bonded lube layer thickness of about 6 Å and a mobile lube layer thereon, and laser treating the deposited lubricant to increase the thickness of the as-deposited bonded lube layer to about 13 Å while also reducing the thickness of the as-deposited mobile lube layer.

In accordance with the present invention any of various types of laser light beams can be employed, such as a continuous-wave form (CW) laser or a pulsed-wave form (pulsed) laser, as with a laser light beam having a wavelength of about 0.4 $\mu$m to about 10 $\mu$m, e.g., about 1 $\mu$m. For example, a laser light beam is initially focused at the disk surface at the inner radius of the data zone. The disk is then rotated and the focused laser light beam is linearly traversed in a radial direction towards the outer diameter at an appropriate linear speed until traversing the entire data zone. The focused laser light beam provides accurate energy to vaporize a desired amount of lubricant on the disk surface to generate an accurately controlled thinner lube layer over the data zone. In addition, the deposited raw lubricant having a relatively broad molecular weight distribution is fractionated in-situ to reduce the molecular weight distribution by about 30%, and, the original thickness of the bonded lube layer is increased by no less than 100%.

Embodiments of the present invention can be implemented to produce a lubricant topcoat having a single substantially uniform thickness across the entire disk surface, or differential thicknesses depending upon the optimum design requirements for a particular magnetic recording medium. The optimum parameters for achieving a desired thickness of the lubricant topcoat over the data zone can be readily determined in a particular situation. For example, the amount of lubricant vaporized by the laser light beam depends on various parameters, such as the laser beam wavelength, the laser peak energy and average energy, the speed of the laser beam movement and the lubricant itself.

The present invention is applicable to forming a lubricant topcoat on any of various conventional magnetic recording medium structures comprising a nonmagnetic substrate, an underlayer thereon, a magnetic layer, e.g., a cobalt-based alloy, on the underlayer, and a protective overcoat, typically a carbon-containing protective overcoat, on the magnetic layer. Various structural modifications can be employed, as by employing plural underlayers below and intermediate layers above the magnetic layer. The materials and methodology involved in forming a conventional magnetic recording medium structure are well known and, hence, not set forth herein in detail.

Any of various conventional lubricant topcoat materials can be employed in practice of the present invention, such as conventional perfluropolyethers. In addition, the lubricant topcoat encompassed by the present invention can be applied by any of various conventional techniques, including thermal treatment and ultraviolet irradiation and sulking. Embodiments of the present invention comprise applying a lubricant topcoat on a magnetic recording medium structure having a surface containing a landing zone and a conventional smooth data zone, as well as a laser textured data zone.

Figure 2:
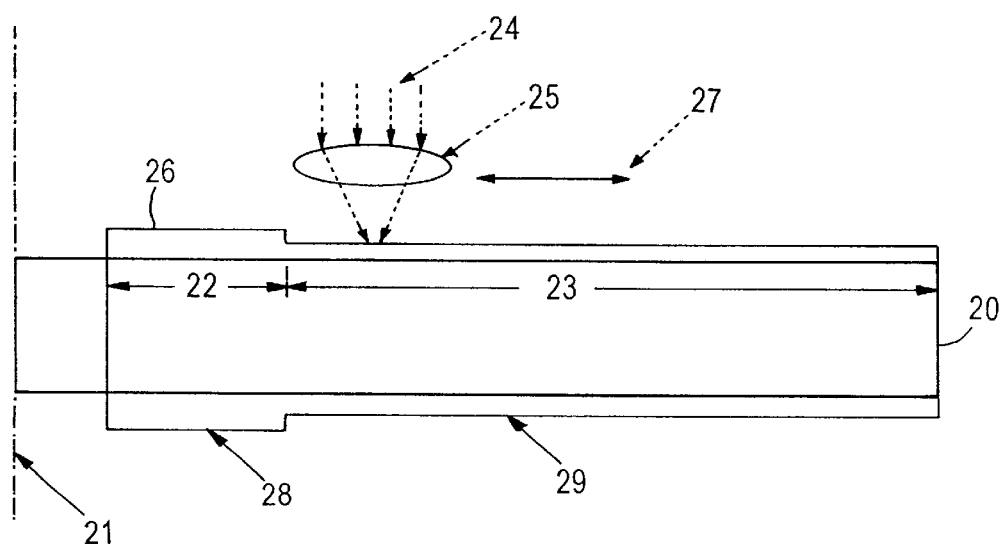
FIG. 2 schematically illustrates an embodiment of the present invention.

An embodiment of the present invention is schematically illustrated in FIG. 2, wherein a portion of magnetic recording disk 20, having deposited thereon a raw lubricant with a broad molecular weight distribution, e.g., about 900 to about 10,000, is rotated about disk center line 21, as on a spindle (not shown) typically employed when laser texturing a landing zone. The portion of disk 20 containing the landing zone is designated by reference numeral 22, while reference numeral 23 designates the data zone surface portion. A laser light beam 24, such as a CW laser or a pulsed laser, is passed through a focusing lens 25 and impinged on lubricant topcoat 26 while linearly traversing the surface of the lubricant topcoat in a radial direction as shown by arrows 27. The resulting lubricant topcoat exhibits a significantly reduced molecular weight distribution, e.g., about 3,500±100 and a significantly increased bonded lube layer thickness. In addition, the resulting lubricant topcoat exhibits a greater thickness 28 over the landing zone 22 than the thickness 29 over the data zone 23.

EXAMPLE

A ZDOL®-type lubricant, i.e., a conventional perfluoropolyether alcohol lubricant having a molecular weight distribution of about 900 to about 10,000, marketed by Ausimont, USA, located in Thorofare, N.J., was applied to a conventional magnetic recording medium structure containing a carbon-containing protective overcoat at a substantially uniform thickness. The as-deposited lubricant coating comprised a bonded lube layer was about 6 Å. A YAG laser having a wavelength of 1.064 μm and CW mode was impinged on the disk surface at a laser power of 1.31W to 1.98W with a focused beam diameter of about 25 μm. The disk was rotated at 640 rpm with linear motion along the radial direction of the laser light beam across the data zone at 0.002 inches per second during laser treatment. The laser treated lubricant exhibited a narrow molecular weight distribution of about 3,500±100 and had a bonded lube layer thickness of about 13 Å. For a lustrative simplicity, FIG. 2 illustrates the use of a laser light beam to reduce the thickness of the lubricant topcoat in a selected area. However, it should be apparent that in practicing embodiments of the present invention, the entire as-deposited lubricant coating can be subjected to laser treatment to effect the objectives of the present invention, i.e., in-situ fractionation and increased bonded lube layer thickness. Laser powers of about 1.79W to about 2.47W have also been employed with excellent results.

In practicing the present invention, the non-magnetic substrate can be any substrate typically employed in the manufacture of recording media, such as a metal substrate or an alternative substrate comprising a glass, ceramic or glass-ceramic material or a plastic. Other conventional substrates include aluminum alloy substrates with a coating thereon, such as nickel-phosphorous. It should be understood that embodiments of the present invention include texturing opposite surfaces of a conventional non-magnetic substrate to provide a laser textured landing zone and/or laser textured data zone, with subsequent deposition of plurality of layers on both sides of the substrate. In accordance with the present invention, a raw lubricant having a molecular weight distribution is deposited and treated with a laser light beam to effect in-situ fractionation thereby significantly reducing the molecular weight distribution by at least about 30% and significantly increasing the thickness of the bonded lube layer by at least 100%.

The magnetic layers deposited in accordance with the present invention can be any of those conventionally employed in the production of magnetic recording media, such as cobalt-based alloys. As in conventional practices, one or more underlayers can be deposited on the textured substrate prior to depositing the magnetic layer. Typical underlayers include chromium or chromium alloys, such as chromium-vanadium or chromium-titanium, oxygen-doped chromium, tungsten or a tungsten alloy. Conventional protective overcoats employed embodiments of the present invention include carbon overcoats. The underlayers, magnetic layers and protective overcoats can be applied in a conventional manner, as by any of various sputtering techniques, deposited at conventional thicknesses employed in the production of recording media.

The present invention can be employed to produce any of various types of magnetic recording media, including think film disks, with an attendant improvement in tribological performance and reduced fly-stiction. The present invention enjoys industrial applicability in the manufacture of any of various types of magnetic recording media, particularly high aerial recording density magnetic recording media.

Only the preferred embodiment of the invention and but a few examples of its versatility are shown and described in the present disclosure. It is to be understood that the present invention is capable of use in various other combinations and environments, and is capable of changes or modifications within the scope of the inventive concept as expressed herein.

What is claimed:

1. A method of manufacturing a magnetic recording medium, the method comprising:
    applying a lubricant having a broad molecular weight distribution to form a lubricant coating having a first thickness on a surface of a composite containing a magnetic layer on a non-magnetic substrate, the surface of the composite containing having a landing zone and a data zone; and
    treating the applied lubricant coating with a laser light beam to effect in-situ fractionation, thereby reducing the molecular weight distribution of the lubricant by at least about 30%.

2. The method according to claim 1, comprising applying a perfluorpolyether to form the lubricant coating.

3. The method according to claim 1, wherein the composite comprises a protective overcoat on the magnetic layer, the method comprising applying the lubricant coating on the protective overcoat.

4. The method according to claim 3, wherein the protective overcoat comprises carbon.

5. The method according to claim 1, further comprising treating the applied lubricant coating with a laser light beam to reduce the first thickness of the lubricant coating over the data zone to a second thickness by vaporizing a portion of the lubricant such that the thickness of the lubricant coating over the landing zone is greater than the second thickness.

6. The method according to claim 5, comprising treating the applied lubricant with the laser light beam to reduce the first thickness of the lubricant coating over the data zone such that the difference in thickness in the lubricant coating over the landing zone exceeds the thickness of the lubricant coating over the data zone by about 5 Å to about 1 Å.

7. The method according to claim 5, wherein:
    the magnetic recording medium is disk shaped and comprises an inner diameter and an outer diameter;
    the landing zone comprises an annular zone between the data zone and the inner diameter; and
    the data zone comprises an annular zone between the landing zone and the outer diameter.

8. A method of manufacturing a magnetic recording medium, the method comprising:
    applying a perfluorpolymer lubricant having a molecular weight distribution of about 500 to about 15,000 to form a lubricant coating having a first thickness on a surface of a composite containing a magnetic layer on a non-magnetic substrate, the surface of the composite containing having a landing zone and a data zone; and
    treating the applied lubricant coating with a laser light beam to effect in-situ fractionation thereby reducing the molecular weight distribution to about 3,500±100.

9. A method of manufacturing a magnetic recording medium, the method comprising:
    applying a perfluorpolymer lubricant having a broad molecular weight distribution of about 900 to about 10,000 to form a lubricant coating having a first thickness on a surface of a composite containing a magnetic layer on a non-magnetic substrate, the surface of the composite containing having a landing zone and a data zone; and
    treating the applied lubricant coating with a laser light beam effect in-situ fractionation, thereby reducing the molecular weight distribution of the lubricant to about 3,00±200.

10. A method of manufacturing a magnetic recording medium, the method comprising:

applying a lubricant having a broad molecular weight distribution to form a lubricant coating having a first thickness on a surface of a composite containing a magnetic layer on a non-magnetic substrate, the surface of the composite having a landing zone and a data zone, wherein the applied lubricant coating comprises a bonded lube layer having a first thickness and is directly bonded to the surface of the composite and a mobile layer having a first thickness and is located on the bonded layer; and treating the applied lubricant coating with a laser light beam to effect in-situ fractionation, thereby reducing the molecular weight distribution of the lubricant, wherein the laser light beam also acts to increase the first thickness of the bonded lube layer by no less than about 100% to a second thickness.

11. The method according to claim 10, wherein:

the first thickness of the bonded lube layer is about 6 Å; and the second thickness of the bonded lube layer is about 13 Å.

12. The method according to claim 10, comprising treating the lubricant coating with a laser light beam to increase the first thickness of the bonded lube layer to a second thickness and to reduce the first thickness of the mobile lube layer.

13. A method of manufacturing a magnetic recording medium, the method comprising:

applying a lubricant on a surface of a composite containing a magnetic layer on a non-magnetic substrate to form a lubricant coating comprising a bonded lube layer having a first thickness and directly bonded to the surface of the composite and a mobile lube layer having a first thickness and on the bonded lube layer; and treating the applied lubricant coating with a laser light beam to increase the first thickness of the bonded lube layer by no less than 100% to a second thickness.

14. The method according to claim 13, wherein the composite comprises a carbon-containing protective overcoat on the magnetic layer, the method comprising depositing the lubricant coating on the carbon-containing protective overcoat.

15. The method according to claim 13:

wherein the first thickness of the bonded lube layer is about 6 Å; and the second thickness of the bonded lube layer is about 13 Å.

16. The method according to claim 13, comprising treating the applied lubricant coating with a laser light beam to increase the first thickness of the bonded lube layer to a second thickness and to reduce the first thickness of the mobile lube layer.

* * * * *